United States Patent
Petite et al.

(10) Patent No.: US 7,263,073 B2
(45) Date of Patent: *Aug. 28, 2007

(54) SYSTEMS AND METHODS FOR ENABLING A MOBILE USER TO NOTIFY AN AUTOMATED MONITORING SYSTEM OF AN EMERGENCY SITUATION

(75) Inventors: Thomas D. Petite, Douglasville, GA (US); James Davis, Woodstock, GA (US)

(73) Assignee: Statsignal IPC, LLC, Atlanta, GA (US)

( * ) Notice: Subject to any disclaimer, the term of this patent is extended or adjusted under 35 U.S.C. 154(b) by 1031 days.

This patent is subject to a terminal disclaimer.

(21) Appl. No.: 09/925,270

(22) Filed: Aug. 9, 2001

(65) Prior Publication Data

US 2002/0012323 A1 Jan. 31, 2002

Related U.S. Application Data

(63) Continuation-in-part of application No. 09/704,150, filed on Nov. 1, 2000, now Pat. No. 6,891,838, and a continuation-in-part of application No. 09/271,517, filed on Mar. 18, 1999, now abandoned, and a continuation-in-part of application No. 09/439,059, filed on Nov. 12, 1999, now Pat. No. 6,437,692.

(60) Provisional application No. 60/224,047, filed on Aug. 9, 2000.

(51) Int. Cl.
H04L 12/66 (2006.01)
G08C 19/16 (2006.01)
H04J 3/24 (2006.01)

(52) U.S. Cl. ............... 370/278; 370/294; 370/349; 370/352; 340/870.01

(58) Field of Classification Search ............ 370/310; 379/49

See application file for complete search history.

(56) References Cited

U.S. PATENT DOCUMENTS 3,665,475 A  5/1972  Gram (Continued)

FOREIGN PATENT DOCUMENTS

EP  0718954  6/1996

(Continued)

OTHER PUBLICATIONS

Pending U.S. Patent Application entitled "System and Method for Monitoring and Controlling Residential Devices", U.S. Appl. No. 09/704,150, filed Nov. 1, 2000, Inventors: Thomas Petite & Richard Huff.

(Continued)

*Primary Examiner*—Wellington Chin
*Assistant Examiner*—Soon D. Hyun
(74) *Attorney, Agent, or Firm*—Troutman Sanders LLP; James Hunt Yancey, Jr.; Ryan A. Schneider

(57) ABSTRACT

Systems and methods for enabling a mobile user to notify an automated monitoring system of an emergency situation are provided. The automated monitoring system may be configured for monitoring and controlling a plurality of remote devices and may comprise a site controller in communication with the plurality of remote devices via a plurality of transceivers defining a wireless communication network and in communication with a host computer via a wide area network. Briefly described, one such method comprises the steps of: receiving notification that the mobile user desires to initiate transmission of an emergency message to the site controller; determining the identity of the mobile user; and providing an emergency message over the wireless communication network for delivery to the site controller, the emergency message indicating the identity of the mobile user.

21 Claims, 9 Drawing Sheets

U.S. PATENT DOCUMENTS

| | | | |
|---|---|---|---|
| 3,705,385 A | 12/1972 | Batz | |
| 3,723,876 A | 3/1973 | Seaborn, Jr. | |
| 3,742,142 A | 6/1973 | Martin | |
| 3,848,231 A | 11/1974 | Wooten | |
| 3,892,948 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadwhani et al. | |
| 4,025,315 A | 5/1977 | Mazelli | |
| 4,056,684 A | 11/1977 | Lindstrom | |
| 4,058,672 A * | 11/1977 | Crager et al. | 370/394 |
| 4,083,003 A | 4/1978 | Haemmig | |
| 4,120,452 A | 10/1978 | Kimura et al. | |
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,354,181 A | 10/1982 | Spletzer | |
| 4,396,910 A | 8/1983 | Enemark et al. | |
| 4,396,915 A | 8/1983 | Farnsworth et al. | |
| 4,417,450 A | 11/1983 | Morgan, Jr. et al. | |
| 4,436,957 A | 3/1984 | Mazza et al. | |
| 4,446,454 A | 5/1984 | Pyle | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | |
| 4,631,357 A | 12/1986 | Grunig | |
| 4,670,739 A | 6/1987 | Kelly, Jr. | |
| 4,707,852 A | 11/1987 | Jahr et al. | |
| 4,731,810 A | 3/1988 | Watkins | |
| 4,742,296 A | 5/1988 | Petr et al. | |
| 4,757,185 A | 7/1988 | Onishi | |
| 4,800,543 A | 1/1989 | Lyndon-James et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Steck et al. | |
| 4,857,912 A | 8/1989 | Everett, Jr. et al. | |
| 4,875,231 A | 10/1989 | Hara et al. | |
| 4,884,132 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,918,690 A | 4/1990 | Markkula, Jr. et al. | |
| 4,918,995 A | 4/1990 | Pearman et al. | |
| 4,928,299 A | 5/1990 | Tansky et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A | 11/1990 | Reeser | |
| 4,977,612 A | 12/1990 | Wilson | |
| 4,980,907 A | 12/1990 | Raith et al. | |
| 4,989,230 A | 1/1991 | Gillig et al. | |
| 4,991,008 A | 2/1991 | Nama | |
| 4,998,095 A | 3/1991 | Shields | |
| 4,999,607 A | 3/1991 | Evans | 340/539 |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | |
| 5,061,997 A | 10/1991 | Rea et al. | |
| 5,086,391 A | 2/1992 | Chambers | |
| 5,091,713 A | 2/1992 | Horne et al. | |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,131,038 A | 7/1992 | Puhl et al. | |
| 5,134,650 A | 7/1992 | Blackmon | |
| 5,136,285 A | 8/1992 | Okuyama | |
| 5,155,481 A | 10/1992 | Brennan, Jr. et al. | |
| 5,159,317 A | 10/1992 | Brav | |
| 5,162,776 A | 11/1992 | Bushnell et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A | 4/1993 | Hines | |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,231,658 A | 7/1993 | Eftechiou | |
| 5,235,630 A | 8/1993 | Moody et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,252,967 A | 10/1993 | Brennan et al. | |
| 5,253,167 A | 10/1993 | Yoshida et al. | |
| 5,265,150 A | 11/1993 | Heimkamp et al. | |
| 5,265,162 A | 11/1993 | Bush et al. | |
| 5,266,782 A | 11/1993 | Alanara et al. | |
| 5,272,747 A | 12/1993 | Meads | |
| 5,282,204 A | 1/1994 | Shpancer et al. | |
| 5,282,250 A | 1/1994 | Dent et al. | |
| 5,289,165 A | 2/1994 | Belin | |
| 5,295,154 A | 3/1994 | Meier et al. | |
| 5,305,370 A | 4/1994 | Kearns et al. | |
| 5,315,645 A | 5/1994 | Matheny | |
| 5,317,309 A | 5/1994 | Vercellotti et al. | |
| 5,319,364 A | 6/1994 | Waraksa et al. | |
| 5,319,698 A | 6/1994 | Glidwell et al. | |
| 5,319,711 A | 6/1994 | Servi | |
| 5,323,384 A | 6/1994 | Norwood et al. | |
| 5,325,429 A | 6/1994 | Kurgan | |
| 5,331,318 A | 7/1994 | Montgomery | |
| 5,334,974 A | 8/1994 | Simms et al. | |
| 5,343,493 A | 8/1994 | Karimullah | |
| 5,345,231 A | 9/1994 | Koo et al. | |
| 5,347,263 A | 9/1994 | Carroll et al. | |
| 5,354,974 A | 10/1994 | Eisenberg | |
| 5,355,513 A | 10/1994 | Clarke et al. | |
| 5,365,217 A | 11/1994 | Toner | |
| 5,371,736 A | 12/1994 | Evan | |
| 5,382,778 A | 1/1995 | Takahira et al. | |
| 5,383,134 A * | 1/1995 | Wrzesinski | 340/870.03 |
| 5,406,619 A | 4/1995 | Akhteruzzman et al. | |
| 5,412,192 A | 5/1995 | Hoss | |
| 5,412,760 A | 5/1995 | Peitz | |
| 5,416,475 A | 5/1995 | Tolbert et al. | |
| 5,416,725 A | 5/1995 | Pacheco et al. | |

| | | | | | | |
|---|---|---|---|---|---|---|
| 5,418,812 A | 5/1995 | Reyes et al. | | 5,659,303 A | 8/1997 | Adair, Jr. |
| 5,424,708 A | 6/1995 | Ballestry et al. | | 5,668,876 A | 9/1997 | Falk et al. |
| 5,432,507 A | 7/1995 | Mussino et al. | | 5,673,252 A | 9/1997 | Johnson et al. |
| 5,438,329 A | 8/1995 | Gastouniotis et al. ........ 340/870 | | 5,673,304 A | 9/1997 | Connor et al. |
| 5,439,414 A | 8/1995 | Jacob | | 5,673,305 A | 9/1997 | Ross |
| 5,442,553 A | 8/1995 | Parrillo | | 5,682,139 A | 10/1997 | Pradeep et al. |
| 5,445,287 A | 8/1995 | Center et al. | | 5,682,476 A | 10/1997 | Tapperson et al. |
| 5,451,929 A | 9/1995 | Adelman et al. | | 5,689,229 A | 11/1997 | Chaco et al. .......... 340/286.07 |
| 5,451,938 A | 9/1995 | Brennan, Jr. | | 5,699,328 A | 12/1997 | Ishizaki et al. |
| 5,452,344 A | 9/1995 | Larson | | 5,701,002 A | 12/1997 | Oishi et al. |
| 5,465,401 A | 11/1995 | Thompson | | 5,704,046 A | 12/1997 | Hogan |
| 5,467,074 A | 11/1995 | Pedtke | | 5,704,517 A | 1/1998 | Lancaster, Jr. |
| 5,467,082 A | 11/1995 | Sanderson | | 5,706,191 A | 1/1998 | Bassett et al. .............. 364/138 |
| 5,467,345 A | 11/1995 | Cutler et al. | | 5,706,976 A | 1/1998 | Purkey |
| 5,468,948 A | 11/1995 | Koenck et al. | | 5,708,223 A | 1/1998 | Wyss |
| 5,471,201 A | 11/1995 | Cerami et al. | | 5,708,655 A | 1/1998 | Toth |
| 5,473,322 A | 12/1995 | Carney | | 5,712,619 A | 1/1998 | Simkin |
| 5,475,689 A | 12/1995 | Kay et al. | | 5,712,980 A | 1/1998 | Beeler et al. |
| 5,481,259 A | 1/1996 | Bane | | 5,714,931 A | 2/1998 | Petite et al. |
| 5,481,532 A | 1/1996 | Hassan et al. | | 5,717,718 A | 2/1998 | Rowsell et al. |
| 5,484,997 A | 1/1996 | Haynes | | 5,726,634 A | 3/1998 | Hess et al. |
| 5,493,273 A * | 2/1996 | Smurlo et al. .............. 340/541 | | 5,726,984 A | 3/1998 | Kubler et al. |
| 5,493,287 A | 2/1996 | Bane | | 5,732,074 A | 3/1998 | Spaur et al. |
| 5,506,837 A | 4/1996 | Sollner et al. | | 5,732,078 A | 3/1998 | Arango |
| 5,509,073 A | 4/1996 | Monnin | | 5,736,965 A | 4/1998 | Mosebrook et al. |
| 5,513,244 A | 4/1996 | Joao et al. | | 5,740,232 A | 4/1998 | Pailles et al. |
| 5,515,419 A | 5/1996 | Sheffer | | 5,742,509 A | 4/1998 | Goldberg et al. ........ 364/449.5 |
| 5,517,188 A | 5/1996 | Caroll et al. | | 5,745,849 A | 4/1998 | Britton |
| 5,522,089 A | 5/1996 | Kikinis et al. | | 5,748,104 A | 5/1998 | Argyroudis et al. ........ 340/870 |
| 5,528,215 A | 6/1996 | Siu et al. | | 5,748,619 A | 5/1998 | Meier |
| 5,539,825 A | 7/1996 | Akiyama et al. | | 5,754,111 A | 5/1998 | Garcia |
| 5,541,938 A | 7/1996 | Di Zenzo et al. | | 5,754,227 A | 5/1998 | Fukuoka |
| 5,542,100 A | 7/1996 | Hatakeyama | | 5,757,783 A | 5/1998 | Eng et al. |
| 5,544,036 A | 8/1996 | Brown, Jr. et al. ......... 364/145 | | 5,757,788 A | 5/1998 | Tatsumi et al. |
| 5,544,784 A | 8/1996 | Malaspina | | 5,761,083 A | 6/1998 | Brown, Jr. et al. |
| 5,548,632 A | 8/1996 | Walsh et al. | | 5,764,742 A | 6/1998 | Howard et al. |
| 5,550,358 A | 8/1996 | Tait et al. | | 5,771,274 A | 6/1998 | Harris |
| 5,550,359 A | 8/1996 | Bennett | | 5,774,052 A | 6/1998 | Hamm et al. |
| 5,550,535 A | 8/1996 | Park | | 5,781,143 A | 7/1998 | Rossin |
| 5,553,094 A | 9/1996 | Johnson et al. | | 5,790,644 A | 8/1998 | Kikinis |
| 5,555,258 A | 9/1996 | Snelling et al. | | 5,790,662 A | 8/1998 | Valerij et al. |
| 5,555,286 A | 9/1996 | Tendler | | 5,790,938 A | 8/1998 | Talarmo |
| 5,562,537 A | 10/1996 | Zver et al. | | 5,796,727 A | 8/1998 | Harrison et al. |
| 5,565,857 A | 10/1996 | Lee | | 5,798,964 A | 8/1998 | Shimizu et al. |
| 5,568,535 A * | 10/1996 | Sheffer et al. ................ 379/39 | | 5,801,643 A | 9/1998 | Williams et al. |
| 5,572,438 A | 11/1996 | Ehlers et al. ............... 364/492 | | 5,815,505 A | 9/1998 | Mills |
| 5,573,181 A | 11/1996 | Ahmed | | 5,818,822 A | 10/1998 | Thomas et al. |
| 5,574,111 A | 11/1996 | Brichta et al. | | 5,822,273 A | 10/1998 | Bary et al. |
| 5,583,850 A | 12/1996 | Snodgrass et al. .......... 370/342 | | 5,822,544 A | 10/1998 | Chaco et al. ................ 395/202 |
| 5,587,705 A | 12/1996 | Morris | | 5,826,195 A | 10/1998 | Westerlage et al. |
| 5,589,878 A | 12/1996 | Cortjens et al. | | 5,828,044 A | 10/1998 | Jun et al. |
| 5,590,038 A | 12/1996 | Pitroda | | 5,832,057 A | 11/1998 | Furman |
| 5,590,179 A | 12/1996 | Shincovich et al. | | 5,838,223 A | 11/1998 | Gallant et al. ......... 340/286.07 |
| 5,592,491 A | 1/1997 | Dinkins et al. | | 5,838,237 A | 11/1998 | Revell et al. ................ 340/573 |
| 5,594,431 A | 1/1997 | Sheppard et al. | | 5,838,812 A | 11/1998 | Pare, Jr. et al. |
| 5,602,843 A | 2/1997 | Gray | | 5,841,118 A | 11/1998 | East et al. |
| 5,604,414 A | 2/1997 | Milligan et al. | | 5,841,764 A | 11/1998 | Roderique et al. |
| 5,604,869 A | 2/1997 | Mincher et al. | | 5,842,976 A | 12/1998 | Williamson |
| 5,606,361 A | 2/1997 | Davidsohn et al. | | 5,844,808 A | 12/1998 | Konsmo et al. |
| 5,608,786 A | 3/1997 | Gordon | | 5,845,230 A | 12/1998 | Lamberson |
| 5,613,620 A | 3/1997 | Center et al. | | 5,852,658 A | 12/1998 | Knight et al. |
| 5,615,277 A | 3/1997 | Hoffman | | 5,854,994 A | 12/1998 | Canada et al. |
| 5,619,192 A | 4/1997 | Ayala | | 5,862,201 A | 1/1999 | Sands |
| 5,625,410 A | 4/1997 | Washino et al. | | 5,864,772 A | 1/1999 | Alvarado et al. |
| 5,628,050 A | 5/1997 | McGraw et al. | | 5,873,043 A | 2/1999 | Comer ....................... 455/458 |
| 5,629,687 A | 5/1997 | Sutton et al. | | 5,874,903 A | 2/1999 | Shuey et al. |
| 5,629,875 A | 5/1997 | Adair, Jr. | | 5,880,677 A | 3/1999 | Lestician |
| 5,630,209 A | 5/1997 | Wizgall et al. ................ 455/66 | | 5,884,184 A | 3/1999 | Sheffer |
| 5,631,554 A | 5/1997 | Briese et al. | | 5,884,271 A | 3/1999 | Pitroda |
| 5,644,294 A | 7/1997 | Ness | | 5,886,333 A | 3/1999 | Miyake |
| 5,655,219 A | 8/1997 | Jusa et al. | | 5,889,468 A | 3/1999 | Banga |
| 5,657,389 A | 8/1997 | Houvener | | 5,892,690 A * | 4/1999 | Boatman et al. ............. 700/276 |
| 5,659,300 A | 8/1997 | Dresselhuys et al. | | 5,892,758 A * | 4/1999 | Argyroudis ................. 370/335 |

| | | | | | | |
|---|---|---|---|---|---|---|
| 5,892,924 A | 4/1999 | Lyon et al. | | 6,121,885 A | 9/2000 | Masone et al. |
| 5,896,097 A | 4/1999 | Cardozo | | 6,124,806 A | 9/2000 | Cunningham et al. |
| 5,897,607 A | 4/1999 | Jenney et al. | | 6,127,917 A | 10/2000 | Tuttle |
| 5,898,369 A | 4/1999 | Godwin | | 6,128,551 A | 10/2000 | Davis et al. |
| 5,905,438 A | 5/1999 | Weiss et al. | | 6,130,622 A * | 10/2000 | Hussey et al. ............. 340/5.61 |
| 5,907,291 A | 5/1999 | Chen et al. | | 6,133,850 A | 10/2000 | Moore |
| 5,907,491 A * | 5/1999 | Canada et al. ............... 700/108 | | 6,137,423 A | 10/2000 | Glorioso et al. |
| 5,907,540 A | 5/1999 | Hayashi | | 6,140,975 A | 10/2000 | Cohen |
| 5,907,807 A | 5/1999 | Chavez, Jr. et al. | | 6,141,347 A | 10/2000 | Shaughnessy et al. |
| 5,914,672 A | 6/1999 | Glorioso et al. | | 6,150,936 A | 11/2000 | Addy |
| 5,914,673 A | 6/1999 | Jennings et al. | | 6,150,955 A | 11/2000 | Tracy et al. |
| 5,917,405 A | 6/1999 | Joao | | 6,157,464 A | 12/2000 | Bloomfield et al. |
| 5,917,629 A | 6/1999 | Hortensius et al. | | 6,157,824 A | 12/2000 | Bailey |
| 5,923,269 A | 7/1999 | Shuey et al. | | 6,163,276 A | 12/2000 | Irving et al. ............. 340/870.4 |
| 5,926,103 A | 7/1999 | Petite | | 6,172,616 B1 | 1/2001 | Johnson et al. |
| 5,926,529 A | 7/1999 | Hache et al. | | 6,174,205 B1 | 1/2001 | Madsen et al. |
| 5,926,531 A | 7/1999 | Petite | | 6,175,922 B1 | 1/2001 | Wang |
| 5,933,073 A | 8/1999 | Shuey | | 6,177,883 B1 | 1/2001 | Jennetti et al. |
| 5,941,363 A | 8/1999 | Partyka et al. | | 6,181,255 B1 | 1/2001 | Crimmins et al. |
| 5,941,955 A | 8/1999 | Wilby et al. | | 6,181,284 B1 | 1/2001 | Madsen et al. |
| 5,948,040 A | 9/1999 | DeLorme et al. | | 6,181,981 B1 | 1/2001 | Varga et al. |
| 5,949,779 A | 9/1999 | Mostafa et al. ............. 370/389 | | 6,188,354 B1 | 2/2001 | Soliman et al. |
| 5,949,799 A | 9/1999 | Grivna et al. | | 6,192,390 B1 | 2/2001 | Berger et al. |
| 5,953,371 A | 9/1999 | Rowsell et al. | | 6,198,390 B1 | 3/2001 | Schlager et al. |
| 5,955,718 A | 9/1999 | Levasseur et al. | | 6,199,068 B1 | 3/2001 | Carpenter |
| 5,960,074 A | 9/1999 | Clark | | 6,208,266 B1 | 3/2001 | Lyons et al. |
| 5,963,146 A | 10/1999 | Johnson et al. | | 6,215,404 B1 | 4/2001 | Morales ................. 340/106.09 |
| 5,963,452 A | 10/1999 | Etoh et al. | | 6,218,953 B1 | 4/2001 | Petite |
| 5,963,650 A | 10/1999 | Simionescu et al. | | 6,218,983 B1 | 4/2001 | Kerry et al. |
| 5,969,608 A | 10/1999 | Sojdehei et al. | | 6,219,409 B1 | 4/2001 | Smith et al. ........... 379/106.09 |
| 5,973,756 A | 10/1999 | Erlin | | 6,229,439 B1 | 5/2001 | Tice .......................... 340/506 |
| 5,978,364 A | 11/1999 | Melnik | | 6,233,327 B1 | 5/2001 | Petite |
| 5,978,371 A | 11/1999 | Mason, Jr. et al. ......... 370/389 | | 6,234,111 B1 | 5/2001 | Ulman et al. |
| 5,986,574 A | 11/1999 | Colton ................. 340/870.02 | | 6,236,332 B1 | 5/2001 | Conkright et al. |
| 5,987,421 A | 11/1999 | Chuang | | 6,243,010 B1 | 6/2001 | Addy et al. |
| 5,991,639 A | 11/1999 | Rautiola et al. | | 6,246,677 B1 | 6/2001 | Nap et al. |
| 5,994,892 A | 11/1999 | Turino et al. | | 6,249,516 B1 | 6/2001 | Brownrigg et al. |
| 5,995,592 A | 11/1999 | Shirai et al. | | 6,259,369 B1 | 7/2001 | Monico |
| 5,995,593 A | 11/1999 | Cho | | 6,286,756 B1 | 9/2001 | Stinson et al. |
| 5,997,170 A | 12/1999 | Brodbeck | | 6,288,634 B1 | 9/2001 | Weiss et al. |
| 5,999,094 A | 12/1999 | Nilssen | | 6,288,641 B1 | 9/2001 | Carsais |
| 6,005,759 A | 12/1999 | Hart et al. | | 6,295,291 B1 | 9/2001 | Larkins |
| 6,005,963 A | 12/1999 | Bolle et al. | | 6,301,514 B1 | 10/2001 | Canada et al. |
| 6,021,664 A | 2/2000 | Granato et al. | | 6,305,602 B1 | 10/2001 | Grabowski et al. |
| 6,023,223 A | 2/2000 | Baxter, Jr. | | 6,308,111 B1 | 10/2001 | Koga |
| 6,028,522 A | 2/2000 | Petite | | 6,311,167 B1 | 10/2001 | Davis et al. |
| 6,028,857 A | 2/2000 | Poor | | 6,314,169 B1 | 11/2001 | Schelberg, Jr. et al. |
| 6,031,455 A | 2/2000 | Grube et al. | | 6,317,029 B1 | 11/2001 | Fleeter |
| 6,032,197 A | 2/2000 | Birdwell et al. | | 6,334,117 B1 | 12/2001 | Covert et al. |
| 6,035,266 A | 3/2000 | Williams et al. | | 6,351,223 B1 | 2/2002 | DeWeerd et al. |
| 6,036,086 A | 3/2000 | Sizer, II et al. | | 6,356,205 B1 | 3/2002 | Salvo et al. |
| 6,038,491 A | 3/2000 | McGarry et al. | | 6,357,034 B1 | 3/2002 | Muller et al. |
| 6,044,062 A | 3/2000 | Brownrigg et al. | | 6,362,745 B1 | 3/2002 | Davis |
| 6,054,920 A | 4/2000 | Smith et al. | | 6,363,057 B1 | 3/2002 | Ardalan et al. |
| 6,060,994 A | 5/2000 | Chen | | 6,366,217 B1 | 4/2002 | Cunningham et al. |
| 6,061,604 A | 5/2000 | Russ et al. ................... 700/90 | | 6,369,769 B1 | 4/2002 | Nap et al. |
| 6,064,318 A | 5/2000 | Kirchner, III et al. | | 6,370,489 B1 | 4/2002 | Williams et al. |
| 6,067,017 A | 5/2000 | Stewart et al. | | 6,373,399 B1 | 4/2002 | Johnson et al. |
| 6,067,030 A | 5/2000 | Burnett et al. | | 6,380,851 B1 | 4/2002 | Gilbert et al. |
| 6,069,886 A | 5/2000 | Ayerst et al. | | 6,384,722 B1 | 5/2002 | Williams |
| 6,073,169 A | 6/2000 | Shuey et al. | | 6,393,341 B1 | 5/2002 | Lawrence et al. |
| 6,073,266 A | 6/2000 | Ahmed et al. ............... 714/749 | | 6,393,381 B1 | 5/2002 | Williams et al. |
| 6,073,840 A | 6/2000 | Marion | | 6,393,382 B1 | 5/2002 | Williams et al. |
| 6,075,451 A | 6/2000 | Lebowitz et al. | | 6,396,839 B1 | 5/2002 | Ardalan et al. |
| 6,087,957 A | 7/2000 | Gray | | 6,400,819 B1 * | 6/2002 | Nakano et al. ............. 379/229 |
| 6,088,659 A | 7/2000 | Kelley et al. ................. 702/62 | | 6,401,081 B1 | 6/2002 | Montgomery et al. |
| 6,094,622 A | 7/2000 | Hubbard et al. | | 6,411,889 B1 | 6/2002 | Mizunuma et al. |
| 6,100,817 A | 8/2000 | Mason, Jr. et al. ...... 340/870.2 | | 6,415,245 B2 | 7/2002 | Williams et al. |
| 6,101,427 A | 8/2000 | Yang | | 6,422,464 B1 | 7/2002 | Terranova |
| 6,101,445 A | 8/2000 | Alvarado et al. | | 6,424,270 B1 | 7/2002 | Ali |
| 6,112,983 A | 9/2000 | D'Anniballe et al. | | 6,424,931 B1 | 7/2002 | Sigmar et al. |
| 6,119,076 A | 9/2000 | Williams et al. | | 6,430,268 B1 | 8/2002 | Petite |
| 6,121,593 A | 9/2000 | Mansbery et al. .......... 219/679 | | 6,431,439 B1 | 8/2002 | Suer et al. |

| | | |
|---|---|---|
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 * | 12/2002 | Lamberson et al. ......... 340/7.2 |
| 6,491,828 B1 | 12/2002 | Sivavec et al. |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B2 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 * | 5/2003 | Egan et al. ................ 370/356 |
| 6,574,603 B1 | 6/2003 | Dickson et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,671,586 B2 | 12/2003 | Davis et al. |
| 6,674,403 B2 | 1/2004 | Gray et al. |
| 6,678,255 B1 * | 1/2004 | Kuriyan ...................... 370/310 |
| 6,678,285 B1 * | 1/2004 | Garg ......................... 370/473 |
| 6,731,201 B1 | 5/2004 | Bailey et al. |
| 6,735,630 B1 * | 5/2004 | Gelvin et al. ............... 709/224 |
| 6,747,557 B1 | 6/2004 | Petite et al. |
| 6,771,981 B1 | 8/2004 | Zalewski et al. |
| 6,891,838 B1 | 5/2005 | Petite |
| 6,914,533 B2 | 7/2005 | Petite |
| 6,914,893 B2 | 7/2005 | Petite |
| 6,959,550 B2 | 11/2005 | Freeman et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0013679 A1 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0210638 A1 | 11/2003 | Yoo |
| 2004/0053639 A1 | 3/2004 | Petite |
| 2004/0183687 A1 | 9/2004 | Petite |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |

FOREIGN PATENT DOCUMENTS

| | | |
|---|---|---|
| EP | 0825577 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| WO | WO 90/13197 | 11/1990 |
| WO | WO 98/00056 | 1/1998 |
| WO | WO 98/37528 | 8/1998 |
| WO | WO 99/13426 | 3/1999 |
| WO | 200023956 A1 | 4/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO02/052521 | 7/2002 |
| WO | WO 03/007264 | 1/2003 |
| WO | WO03/007264 | 1/2003 |
| WO | WO 03/021877 | 3/2003 |

OTHER PUBLICATIONS

Pending U.S. Patent Application entitled "System for Monitoring Conditions in a Residential Living Community", U.S. Appl. No. 09/271,517, filed Mar. 18, 1999, Inventor: Thomas D. Petite.

Pending U.S. Patent Application entitled "System and Method for Monitoring and Controlling Remote Devices", U.S. Appl. No. 09/439,059, filed Nov. 12, 1999, Inventors: Thomas Petite & Richard Huff.

Westcott, Jil et al., "A Distributed Routing Design For A Broadcast Environment", IEEE 1982, pp. 10.4.0-10.4.5.

Khan, Robert E. et al., "Advances in Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.

Lynch, Clifford A. et al., Packet Radio Networks, "Architectures, Protocols, Technologies and Applications,".

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

Khan, Robert E., "The Organization of Computer Resources into a Packet Radio Network," IEEE, Jan. 1977, vol. Com-25 No. 1, pp. 169-178.

Westcott, Jill A., "Issues in Distributed Routing for Mobile Packet Radio Network," IEEE 1982, pp. 233-238.

* cited by examiner

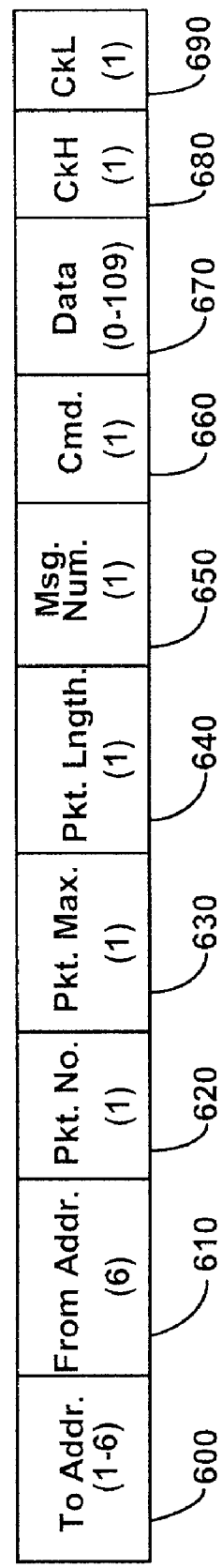
FIG. 6  Message Structure

FIG. 7

| "To Address" | Byte Assignment: |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner<br>ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner<br>Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

Central Server to Personal Transceiver - Broadcast Message - FF (Emergency)

Byte Count = 12

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

FIG. 8

SYSTEMS AND METHODS FOR ENABLING A MOBILE USER TO NOTIFY AN AUTOMATED MONITORING SYSTEM OF AN EMERGENCY SITUATION

CROSS-REFERENCE TO RELATED APPLICATIONS

This application is a continuation-in-part of U.S. patent application Ser. No. 09/704,150, filed Nov. 1, 2000, now U.S. Pat. No. 6,891,838, and entitled "System and Method for Monitoring and Controlling Residential Devices;" U.S. patent application Ser. No. 09/271,517, filed Mar. 18, 1999, now abandoned, and entitled "System For Monitoring Conditions in a Residential Living Community;" and U.S. patent application Ser. No. 09/439,059, filed Nov. 12, 1999, now U.S. Pat. No. 6,437,692 and entitled "System and Method for Monitoring and Controlling Remote Devices." Each of the identified U.S. patent applications is hereby incorporated by reference in its entirety. This application also claims the benefit of U.S. Provisional Application Ser. No. 60/224,047, filed Aug. 9, 2000, and entitled "Design Specifications for a Personal Security Device (FOB)," which is hereby incorporated by reference in its entirety.

FIELD OF THE INVENTION

The present invention generally relates to remotely operated systems, and more particularly to a computerized system for monitoring and reporting on remote systems by transferring information via radio frequency (RF) signals via a message protocol system.

BACKGROUND

There are a variety of systems for monitoring and/or controlling any of a number of systems and/or processes, such as, for example, manufacturing processes, inventory systems, emergency control systems, personal security systems, residential systems, and electric utility meters to name a few. In many of these "automated monitoring systems," a host computer in communication with a communication network, such as a wide area network, monitors and/or controls a plurality of remote devices arranged within a geographical region. The plurality of remote devices typically use remote sensors and actuators to monitor and automatically respond to various system parameters to reach desired results. A number of automated monitoring systems utilize computers to process sensor outputs, to model system responses, and to control actuators that implement process corrections within the system.

For example, both the electric power generation and metallurgical processing industries successfully control production processes by implementing computer control systems in individual plants. Home security has been greatly increased due to automated monitoring devices. Many environmental and safety systems require real-time monitoring. Heating, ventilation, and air-conditioning systems (HVAC), fire reporting and suppression systems, alarm systems, and access control systems utilize real-time monitoring and often require immediate feedback and control.

A problem with expanding the use of automated monitoring systems is the cost of the sensor/actuator infrastructure required to monitor and control such systems. The typical approach to implementing automated monitoring system technology includes installing a local network of hard-wired sensor(s)/actuator(s) and a site controller. There are expenses associated with developing and installing the appropriate sensor(s)/actuator(s) and connecting functional sensor(s)/actuator(s) with the site controller. Another prohibitive cost of control systems is the installation and operational expenses associated with the site controller.

Another problem with using automated monitoring system technology is the geographic size of automated monitoring systems. In a hard-wired automated monitoring system, the geographic size of the system may require large amounts of wiring. In a wireless automated monitoring system, the geographic size of the automated monitoring system may require wireless transmissions at unacceptable power levels.

Another problem is that communications within the automated monitoring system can only be initiated by the host computer, some other computing device connected to the host computer via a wide area network, or one of the remote devices being monitored. Individuals associated with the remote devices and/or personnel associated with the automated monitoring system have no additional means of communicating various conditions within the automated monitoring system. For example, in situations where the automated monitoring system is susceptible to emergency situations and/or unforeseen events, it may be beneficial to enable users and other personnel the ability to flexibly initiate communications without having to access the host computer.

Accordingly, there is a need for automated monitoring systems that overcome the shortcomings of the prior art.

SUMMARY OF THE INVENTION

The present invention provides systems and methods for enabling a mobile user to notify an automated monitoring system of an emergency situation. In general, the automated monitoring system may be configured for monitoring and controlling a plurality of remote devices and may comprise a site controller in communication with the plurality of remote devices via a plurality of transceivers defining a wireless communication network. The remote devices may be controlled via a host computer in communication with the site controller via a communication network, such as a wide area network.

The present invention may be viewed as providing a mobile communication device adapted for use with an automated monitoring system. The automated monitoring system may be configured for monitoring and controlling a plurality of remote devices and may comprise a site controller in communication with the plurality of remote devices via a plurality of transceivers defining a wireless communication network and in communication with a host computer via a wide area network. Briefly described, one of many possible embodiments of the mobile communication device comprises: memory, logic, and a wireless transmitter. Memory may comprise a unique identifier associated with the mobile communication device. The logic may be responsive to a transmit command and may be configured to retrieve the unique identifier from memory and generate a transmit message using a predefined communication protocol being implemented by the wireless communication network. The transmit message generated by the logic may comprise the unique identifier and may be configured such that the transmit message may be received by the site controller via the wireless communication network and such that the site controller may identify the mobile identification device and notify the host computer of the transmit message. The wireless transmitter may be configured for communication over the wireless communication network and configured to provide the transmit signal to the wireless communication network.

The present invention may also be viewed as providing a method for enabling a mobile user to notify an automated monitoring system of an emergency situation. Briefly described, one such method involves the steps of: receiving notification that the mobile user desires to initiate transmission of an emergency message to the site controller; determining the identity of the mobile user; and providing an emergency message over the wireless communication network for delivery to the site controller, the emergency message indicating the identity of the mobile user.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 6 is a table illustrating the message structure of a communication protocol that may be implemented by the automated monitoring system of FIG. 1;

FIG. 7 is a table illustrating several exemplary values for the "to" address in the message structure of FIG. 6;

FIG. 8 illustrates three sample messages using the message protocol of the present invention.

DETAILED DESCRIPTION OF THE PREFERRED EMBODIMENT

Having summarized the invention above, reference is now made in detail to the description of the invention as illustrated in he drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
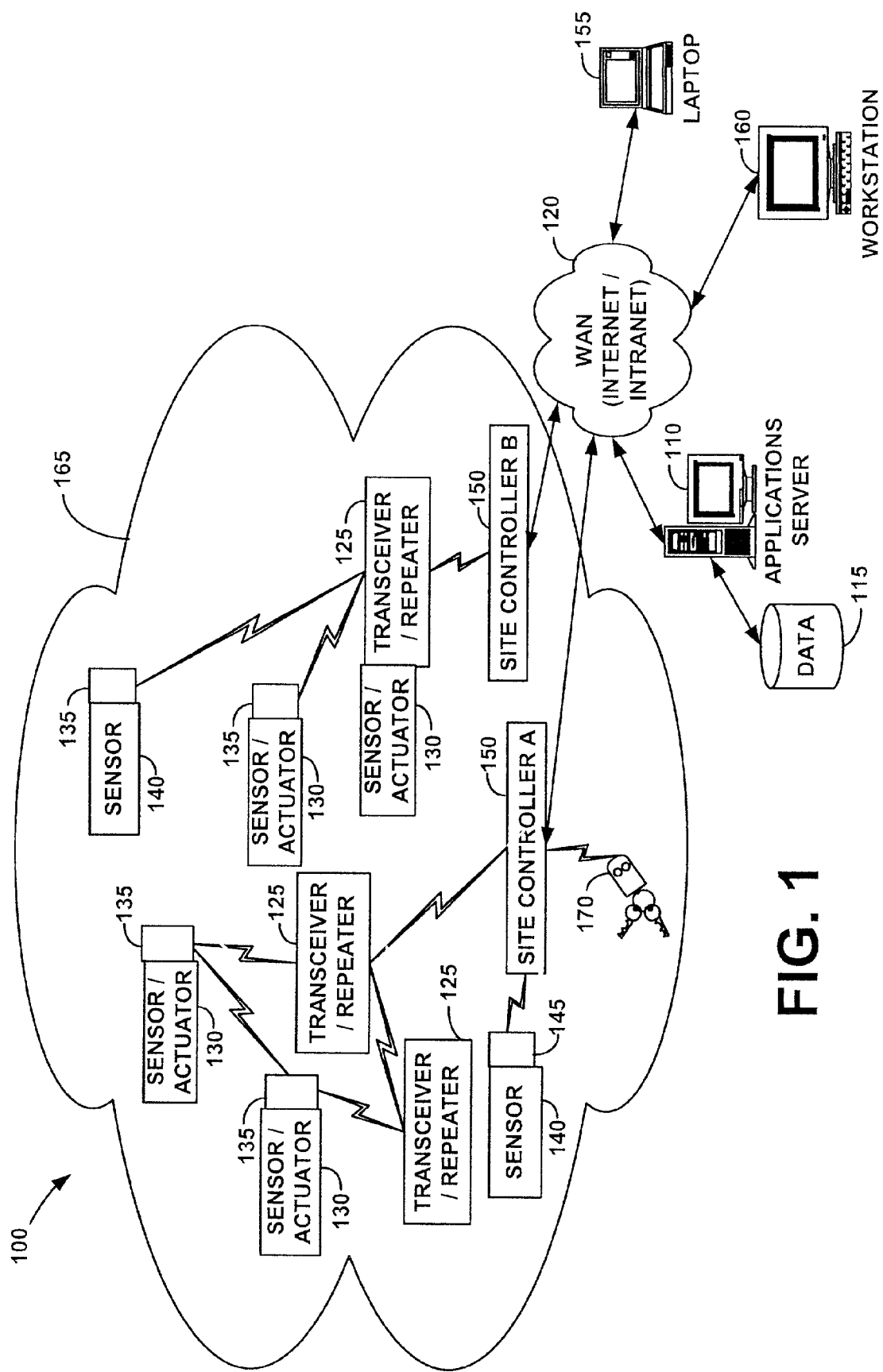
FIG. 1 is a block diagram illustrating one of a number of a number of possible embodiments of an automated monitoring system according to the present invention.

Reference is now made to FIG. 1, which is a schematic diagram illustrating an automated monitoring system 100 according to the present invention. The automated monitoring system 100 may comprise one or more applications servers 110 (one being shown for simplicity of illustration), one or more database servers 115, a WAN 120, one or more repeaters 125, one or more sensor/actuators 130, one or more transceivers 135, one or more sensors 140, one or more transmitters 145, and at least one site controller 150. As further illustrated in FIG. 1, each of the sensor/actuators 130 and the sensors 140 may be integrated with a suitably configured RF transceiver/repeater 125, an RF transceiver 135, or an RF transmitter 145. Hereinafter, the group including an RF transceiver/repeater 125, an RF transceiver 135, and an RF transmitter 145 will be referred to as RF communication devices.

The RF communication devices are preferably small in size and may be configured to transmit a relatively low-power RF signal. As a result, in some applications, the transmission range of a given RF communication device may be relatively limited. Of course, the transmitter power and range may be appropriately designed for the target operating environment. As will be appreciated from the description that follows, this relatively limited transmission range of the RF communications devices is advantageous and a desirable characteristic of the automated monitoring system 100. Although the RF communication devices are depicted without a user interface such as a keypad, etc., in certain embodiments the RF communication devices may be configured with user selectable pushbuttons, switches, or an alphanumeric keypad suitably configured with software and or firmware to accept operator input. The RF communication device may be electrically interfaced with a sensor 140 or with a sensor/actuator 130, such as, for example, a smoke detector, a thermostat, a security system, etc., where user selectable inputs may not be needed. It should be noted that the automated monitoring system 100 is being shown in FIG. 1 with a wide variety of components. One of ordinary skill in the art will appreciate that automated monitoring system 100 may include fewer or more components depending on design needs and the particular environment in which automated monitoring system is implemented.

As illustrated in FIG. 1, one or more sensors 140 may communicate with at least one site controller 150 via an RF transmitter 145, an RF transceiver 135, or an RF transceiver/repeater 125. Furthermore, one or more sensors/actuators 130 may be communicatively coupled to at least one site controller 150 via an RF transceiver 135 or an RF transceiver/repeater 125. In order to send a command from the applications server 111 to a sensor/actuator 130, the RF communication device in communication with the sensors/actuators 130 should be a two-way communication device (i.e., a transceiver). One of ordinary skill in the art will appreciate that that one or more sensors/actuators 130 may be in direct communication with one or more site controllers 150. It will be further appreciated that the communication medium between the one or more sensor/actuators 130 and sensors 140 and the one or more site controllers 150 may be wireless or, for relatively closely located configurations, a wired communication medium may be used.

Alternatively, the RF transceiver 135 may be replaced by an RF transmitter 145. This simplifies the device structure, but also eliminates the possibility of the site controller 150 communicating with remote devices via the transmitter 145.

Automated monitoring system 100 may further comprise a plurality of standalone RF transceivers 125 acting as repeaters. Each repeater 125, as well as each RF transceiver 135, may be configured to receive one or more incoming RF transmissions (transmitted by a remote transmitter 145 or transceiver 135) and to transmit an outgoing signal. This outgoing signal may be another low-power RF transmission signal, a higher-power RF transmission signal, or alternatively may be transmitted over a conductive wire, fiber optic cable, or other transmission media. One of ordinary skill in the art will appreciate that, if an integrated RF communication device (e.g., a RF transmitter 145, a RF transceiver 135, or a RF transceiver/repeater 125) is located sufficiently close to site controller 150 such that the RF signals may be received by the site controller 150, the data transmission signal need not be processed and repeated through either an RF transceiver/repeater 125 or an RF transceiver 135.

As illustrated in FIG. 1, one or more site controllers 150 may be configured and disposed to receive remote data transmissions from the various stand-alone RF transceiver/repeaters 125, integrated RF transmitters 145, and integrated RF transceivers 135. Site controllers 150 may be configured to analyze the transmissions received, convert the transmissions into TCP/IP format and further communicate the remote data signal transmissions to one or more applications servers 110 or other computing devices connected to WAN 120. The site controller B 150 may function as either a back-up site controller in the event of a site controller failure or may function as a primary site controller to expand the potential size of the automated monitoring system 100. As a back-up site controller, the site controller B 150 may function when the applications server 110 detects a site controller failure. Alternatively, the site controller B 150 may function to expand the capacity of automated monitoring system 100. A single site controller 150 may accommodate a predetermined number of remote devices. While the number of remote devices may vary based upon individual requirements, in one embodiment, the number may be equal to approximately 500 remote devices. As stated above, additional site controllers 150 may increase the capacity of automated monitoring system 100. The number of RF communications devices that may be managed by a site controller 150 is limited only by technical constraints, such as memory, storage space, etc In addition, the site controller 150 may manage more addresses than devices because some RF communications devices may have multiple functions, such as sensing, repeating, etc. Since the site controller 150 is in communication with WAN 120, applications server 110 may host application specific software. As described in more detail below, the site controller 150 may communicate information in the form of data and control signals to remote sensor/actuators 130 and remote sensors 140, which are received from applications server 110, laptop computer 155, workstation 160, etc. via WAN 120. The applications server 110 may be networked with a database 115 to record client specific data or to assist the applications server 110 in deciphering a particular data transmission from a particular sensor 140 or actuator/sensor 130.

One of ordinary skill in the art will appreciate that each RF communication device in automated monitoring system 100 has an associated antenna pattern (not shown). The RF communications devices are geographically disposed such that the antenna patterns overlap to create a coverage area 165, which defines the effective area of automated monitoring system 100.

As described in further detail below, automated monitoring system 100 may also include a mobile personal communication device (FOB) 170, which may transmit an emergency message directly or indirectly to a site controller 150. For example, in certain implementations of automated monitoring system 100, such as where the remote devices are electric utility meters or personal security systems, it may be beneficial to enable FOB 170 to transmit an emergency message configured to notify the site controller 150 of the occurrence of an emergency situation. In this manner, automated monitoring system 100 may an FOB 170 configured to transmit an electromagnetic signal that may be encoded with an identifier that is unique to the FOB 170.

Figure 2:
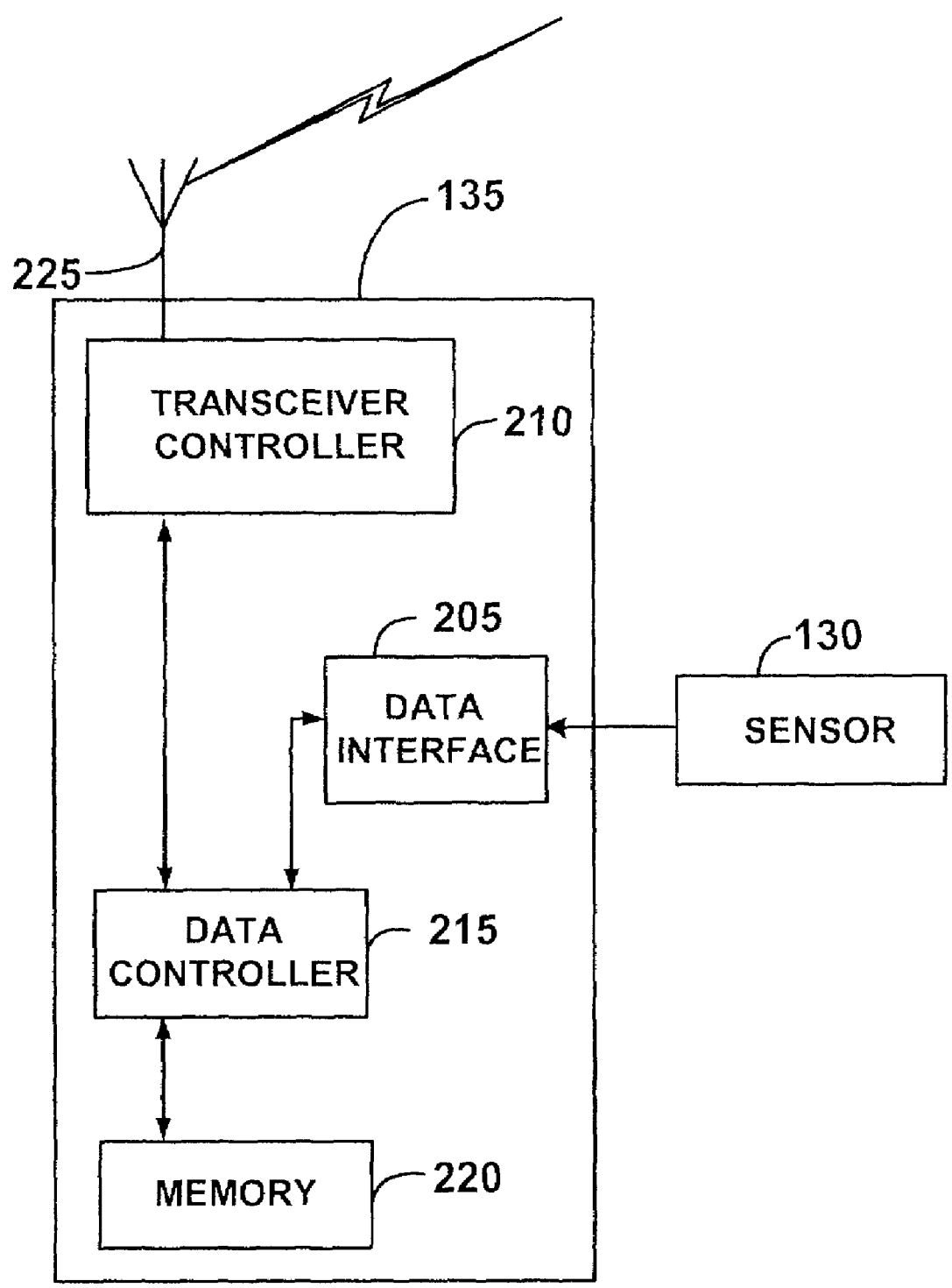
FIG. 2 is a block diagram illustrating one of a number of possible embodiment of the transceiver in FIG. 1 in communication with the sensor of FIG. 1.

Reference is now made to FIG. 2, which is a block diagram illustrating one embodiment of the transceiver 135 and sensor 130 of FIG. 1 in communication with each other. Sensor 130 may be any type of device configured to sense one or more parameters. For example, sensor 130 may be a two-state device such as a smoke alarm. Alternatively, sensor 130 may output a continuous range of values, such as the current temperature, to transceiver 135. If the signal output from the sensor 130 is an analog signal, data interface 205 may include an analog-to-digital converter (not shown) to convert signals provided to the transceiver 135. Alternatively, where sensor 130 provides digital signals, a digital interface may be provided.

In FIG. 2, the sensor 130 may be communicatively coupled with the RF transceiver 135. The RF transceiver 135 may comprise a transceiver controller 210, a data interface 205, a data controller 215, memory 220, and an antenna 225. As shown in FIG. 2, a data signal provided by the sensor 130 may be received at the data interface 205. In situations where the data interface 205 has received an analog data signal, the data interface 205 may be configured to convert the analog signal into a digital signal before forwarding a digital representation of the data signal to the data controller 215.

The RF transceiver 135 has a memory 220 that may contain a unique transceiver identifier that uniquely identifies the RF transceiver 135. The transceiver identifier may be programmable and implemented in the form of, for example, an EPROM. Alternatively, the transceiver identifier may be set/configured through a series of dual inline package (DIP) switches. One of ordinary skill in the art will appreciate that the transceiver identifier and memory 220 may be implemented in a variety of additional ways.

While the unique transceiver address may be varied in accordance with the present invention, it preferably may be a six-byte address. The length of the address may be varied as necessary given design needs. Using the unique transceiver address, the RF communication devices and the site controller 150 may determine, by analyzing the data packets, which devices generated and/or repeated the data packet.

Of course, additional and/or alternative configurations may also be provided by a similarly configured transceiver. For example, a similar configuration may be provided for a transceiver that is integrated into, for example, a carbon monoxide detector, a door position sensor, etc. Alternatively, system parameters that vary across a range of values may be transmitted by transceiver 135 as long as data interface 205 and data controller 215 are configured to apply a specific code that is consistent with the input from sensor 130. As long as the code is understood by the applications server 110 (FIG. 1) or workstation 160 (FIG. 1), the target parameter may be monitored.

Figure 3:
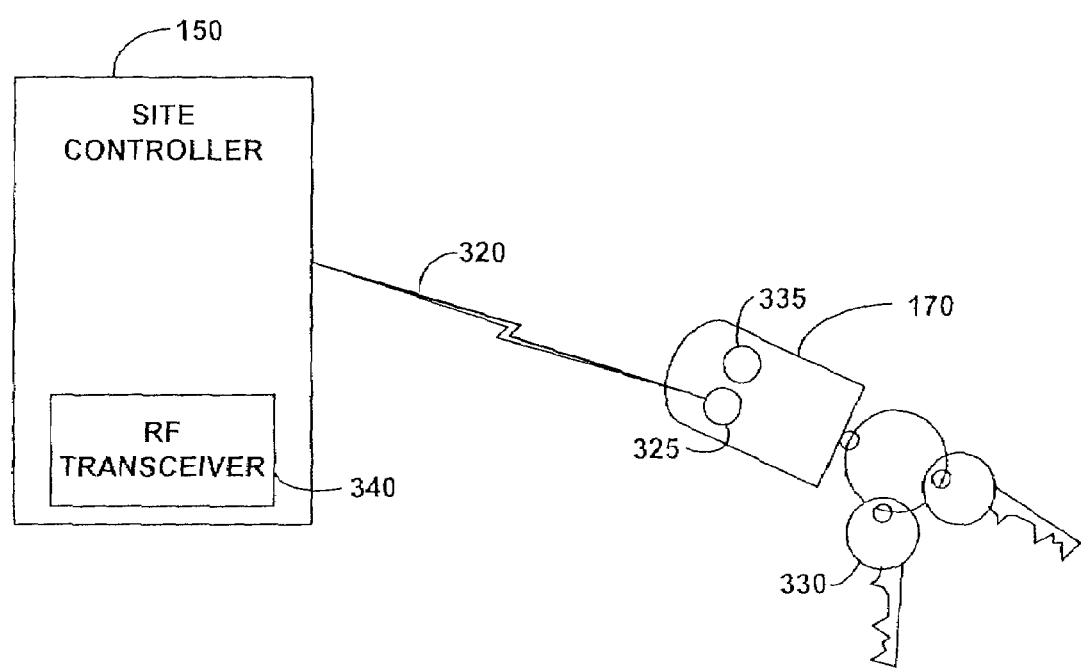
FIG. 3 is a high level diagram of one embodiment of a personnel communication device according to the present invention that may be used to communicate with the site controller of FIG. 1.

FIG. 3 shows a high level diagram of the interaction of the personnel communication device (FOB) 170 and the site controller 150 according to the present invention. The FOB 170 communicates directly or indirectly with the site controller 150. While the FOB 170 will be described in more detail below, in general the FOB 170 transmits an electromagnetic signal to a site controller 150 and/or an RF communication device. The electromagnetic signal may be encoded with a unique transceiver identifier associated with the FOB 170. An internal circuit (not shown) may be provided within the FOB 170 to act upon command to transmit the encoded electromagnetic signal 320. A transmit button 325 may be provided for the user. In the embodiment illustrated in FIG. 3, the FOB 170 is quite small and may be conveniently attached, for example, to a key ring 330, clothing (not shown), etc. for ready and portable use. Furthermore, FOB 170 may be integrated with a mobile electronics device. For instance, FOB 170 may be integrated with a handheld computer, such as a personal digital assistant (PDA), a wireless telephone, or any other mobile electronics device.

Indeed, in another embodiment, the single FOB 170 may serve multiple functions. For example, an FOB 170 may be integrally designed with another device, such as an automotive remote, to provide the dual functionality of remotely controlling an automobile alarm along with the functionality of the FOB 170. In accordance with such an embodiment, a second transmit button 335 may be provided. The first transmit button 325 may be operative to, for example, communicate with the site controller 150, while the second transmit button 335 may be operative to remotely operate the automobile alarm. One of ordinary skill in the art will appreciate that FOB 170 may be integrated with any of a variety of alternative devices with one or more transmit buttons 335. Furthermore, it will be appreciated that the frequency and/or format of the transmit signal 320 transmitted may be different for the different applications. For example, the FOB 170 may transmit a unique identifier to the site controller 150 (FIG. 1), while only a unique activation sequence need be transmitted to actuate an automobile alarm or other device.

In use, a user may simply depress transmit button 325, which would result in the FOB 170 transmitting an electromagnetic signal 320 to the site controller 150. Preferably, the FOB 170 is low power transmitter so that a user may only need to be in close proximity (e.g., several feet) to site controller 150 or one of the RF communication devices of the automated monitoring system 100 (FIG. 1). The FOB 170 may communicate either directly with the site controller 150, if in close proximity, or indirectly via the transceivers and/or repeaters of the automated monitoring system 100. Low-power operation may help to prevent interception of the electromagnetic signals. In alternative embodiments, FOB 170 may be configured such that the transmitted signal may be encrypted for further protect against interception.

The site controller 150 receives and decodes the signal 320 via RF transceiver 340. The site controller 150 then evaluates the received, decoded signal to ensure that the signal identifies a legitimate user. If so, the site controller 150 sends an emergency message to the applications server 110 (FIG. 1).

Figure 4:
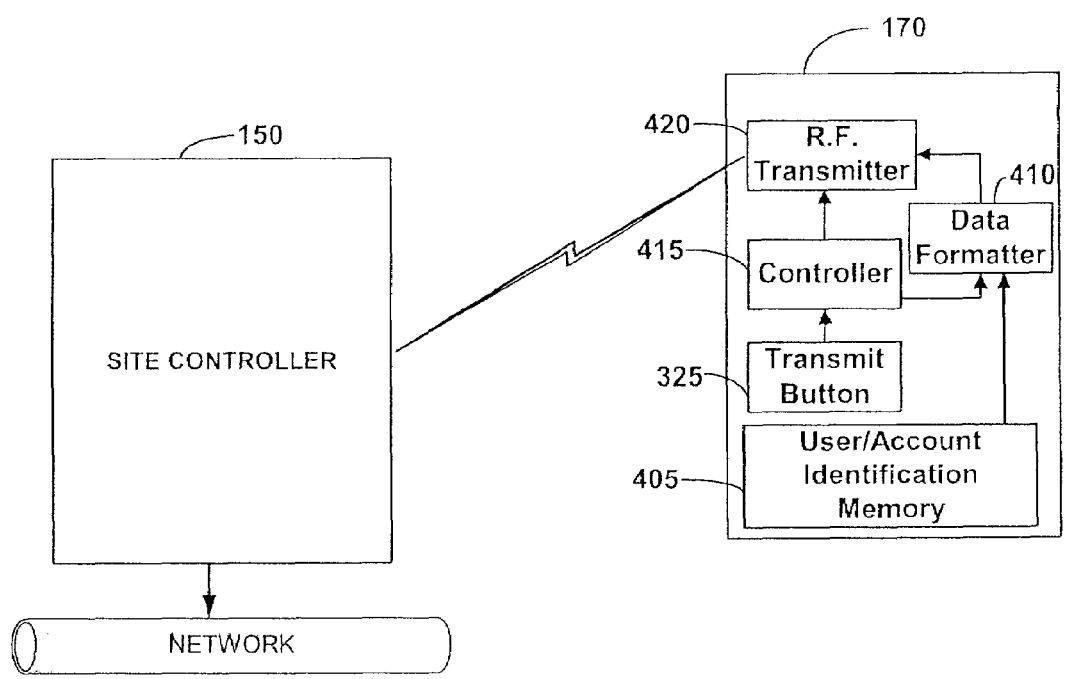
FIG. 4 is a block diagram of the architecture of the personnel communications device of FIG. 3.

Having now presented an overview of the basic operation of FOB 170, reference is made to FIG. 4 which shows a more detailed block diagram of the components contained within an embodiment of FOB 170. As previously mentioned, the FOB 170 includes a transmit button 325, which initiates the data transmission. FOB 170 may include a memory 405, a data formatter 410, a controller 415, and an RF transmitter 420. Depending upon the desired complexity of the automated monitoring system 100 and FOB 170, the RF transmitter 420 may be replaced by an RF transceiver.

Controller 415 controls the overall functionality of FOB 170. The controller 415 is responsive to the depression or actuation of transmit button 325 to begin the data transaction and signal transfer. When a user depresses the transmit button 325, the controller 415 initiates the data transmission sequence by accessing the memory 405, which, among other things, stores the transceiver unique identifier. This information is then passed to the data formatter 410, which places the data in an appropriate and predefined format for transmission to the site controller 150. One of ordinary skill in the art will appreciate that the data may be retrieved from memory 405 and translated into the predefined format as electronic data or in a variety of other ways. When electronic data is used, the data is sent from data formatter 410 to RF transmitter 420 for conversion from electronic to electromagnetic form. As well known by those skilled in the art, a variety of transducers may perform this functionality. One of ordinary skill in the art will appreciate that FOB 170 may implement any of a variety of communication protocols and data formats for communication with automated monitoring system 100. In one embodiment, FOB 170 may implement the communication protocol used by automated monitoring system 100, which is described in more detail below with respect to FIGS. 6-8.

It will be appreciated by persons skilled in the art that the various RF communication devices may be configured with a number of optional power supply configurations. For example, the FOB 170 (FIG. 4) may be powered by a replaceable battery. Those skilled in the art will appreciate how to meet the power requirements of the various devices. As a result, it is not necessary to further describe a power supply suitable for each device and each application in order to appreciate the concepts and teachings of the present invention.

Figure 5:
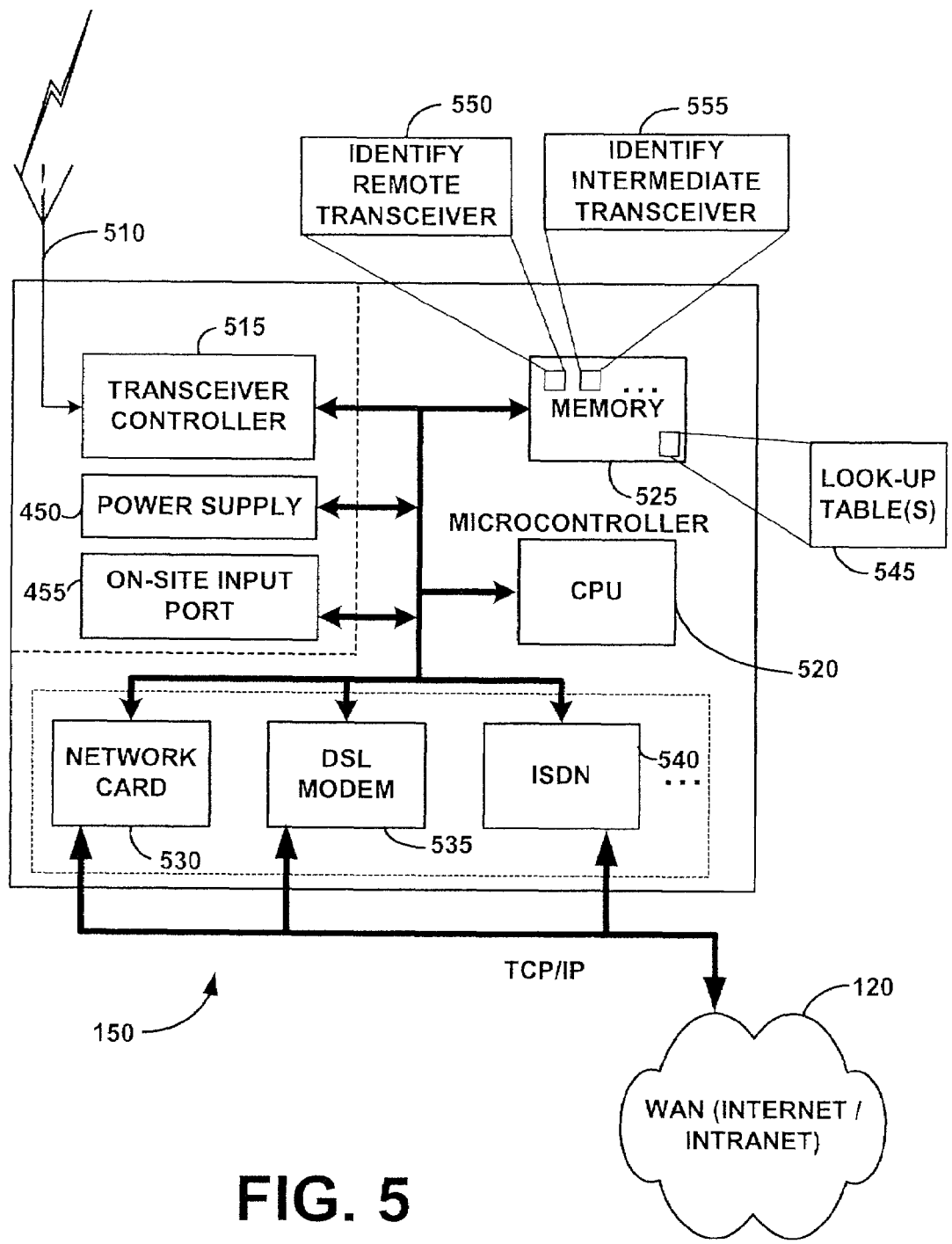
FIG. 5 is a block diagram illustrating one of a number of possible embodiments of the site controller of FIG. 1.

Having illustrated and described the operation of the various combinations of RF communication devices with the various sensors 140, reference is now made to FIG. 5, which is a block diagram further illustrating one embodiment of a site controller 150. According to the present invention, a site controller 150 may comprise an antenna 510, a transceiver controller 515, a central processing unit (CPU) 520, memory 525, a network card 530, a digital subscriber line (DSL) modem 535, an integrated services digital network (ISDN) interface card 540, as well as other components not illustrated in FIG. 5, capable of enabling a transfer control protocol/Internet protocol (TCP/IP) connection to WAN 120.

The transceiver controller 515 may be configured to receive incoming RF signal transmissions via the antenna 510. Each of the incoming RF signal transmissions are consistently formatted as described below. Site controller 150 may be configured such that the memory 525 includes a look-up table 545 configured for identifying the various wireless communication devices (including intermediate wireless communication devices) used in generating and transmitting the received data transmission. As illustrated in FIG. 5, site controller 150 may include an "Identify Remote Transceiver" memory sector 550 and an "Identify Intermediate Transceiver" memory sector 555. Programmed or recognized codes within the memory 525 may also be provided and configured for controlling the operation of a CPU 520 to carry out the various functions that are orchestrated and/or controlled by the site controller 150. For example, the memory 525 may include program code for controlling the operation of the CPU 520 to evaluate an incoming data packet to determine what action needs to be taken. In this regard, one or more look-up tables 545 may also be stored within the memory 525 to assist in this process. Furthermore, the memory 525 may be configured with program code configured to identify a remote RF transceiver 550 or identify an intermediate RF transceiver 555. Function codes, RF transmitter, and/or RF transceiver identification numbers may all be stored with associated information within the look-up tables 545.

Thus, one look-up table 545 may be provided to associate transceiver identificatiers with a particular user. Another look-up table 545 may be used to associate function codes with the interpretation thereof For example, a first data packet segment 550 may be provided to access a first lookup table to determine the identity of the RF transceiver (not shown) that transmitted the received message. A second code segment may be provided to access a second lookup table to determine the proximate location of the RF transceiver that generated the message by identifying the RF transceiver that relayed the message. A third code segment may be provided to identify the content of the message transmitted. Namely, is it a fire alarm, a security alarm, an emergency request by a person, a temperature control setting, etc. In accordance with the present invention, additional, fewer, or different code segments may be provided to carry out different functional operations and data signal transfers of the present invention.

The site controllers 150 may also include one or more network interface devices configured for communication with WAN 120. For example, the site controller 150 may include a network card 530, which may allow the site controller 150 to communicate across a local area network to a network server, which in turn may contain a backup site controller (not shown) to the WAN 120. Alternatively, the site controller 150 may contain a DSL modem 535, which may be configured to provide a link to a remote computing system via the public switched telephone network (PSTN). The site controller 150 may also include an ISDN card 540 configured to communicate via an ISDN connection with a remote system. Other communication interfaces may be provided to serve as primary and/or backup links to the WAN 120 or to local area networks that might serve to permit local monitoring of the operability of site controller 150 and to permit data packet control.

Automated monitoring system 100 may implement any of a variety of types of message protocols to facilitate communication between the remote devices, the RF transceivers, and the site controller 150. FIG. 6 sets forth a message structure for implementing a data packet protocol according to the present invention. All messages transmitted within the automated monitoring system 100 may consist of a "to" address 600, a "from" address 610, a packet number 620, a number of packets in a transmission 630, a packet length 640, a message number 650, a command number 660, any data 670, and a check sum error detector (CKH 680 and CKL 690).

The "to" address 600 indicates the intended recipient of the packet. This address can be scalable from one to six bytes based upon the size and complexity of automated monitoring system 100. By way of example, the "to" address 600 may indicate a general message to all transceivers, to only the stand-alone transceivers, or to an individual integrated transceiver. In a six byte "to" address, the first byte may indicate the transceiver type—to all transceivers, to some transceivers, or a specific transceiver. The second byte may be the identification base, and bytes three through six may be used for the unique transceiver address (either stand-alone or integrated). The "to" address 600 may be scalable from one byte to six bytes or larger depending upon the intended recipient(s).

The "from" address 610 may be a six-byte unique transceiver address of the transceiver originating the transmission. The "from" address 610 may be the address of the site controller 150 when the controller requests data, or this can be the address of the integrated transceiver when the integrated transceiver sends a response to a request for information to the site controller 150.

The packet number 620, the packet maximum 630, and the packet length 640 may be used to concatenate messages that are greater than 128 bytes. The packet maximum 630 may indicate the number of packets in the message. The packet number 620 may be used to indicate a packet sequence number for multiple-packet messages.

The message number 650 may be assigned by the site controller 150. Messages originating from the site controller 150 may be assigned an even number. Responses to the site controller 150 may have a message number 650 equal to the original message number 650 plus one, thereby rendering the responding message number odd. The site controller 150 then increments the message number 650 by two for each new originating message. This enables the site controller 150 to coordinate the incoming responses to the appropriate command message.

The next section is the command byte 660 that may be used to request data from the receiving device as necessary. One of ordinary skill in the art will appreciate that, depending on the specific implementation of automated monitoring system 100, the types of commands may differ. In one embodiment, there may be two types of commands: device specific and not device specific. Device specific commands control a specific device such as a data request or a change in current actuator settings. Commands that are not device specific may include, but are not limited to, a ping, an acknowledge, a non-acknowledgement, downstream repeat, upstream repeat, read status, emergency message, and a request for general data among others. General data may include a software version number, the number of power failures, the number of resets, etc.

The data section 670 may contain data as requested by a specific command. The requested data may be any value. By way of example, test data may be encoded in ASCII (American Standard Code for Information Interchange) or other known encoding systems as known in the art. The data section 670 of a single packet may be scalable, for example, up to 109 bytes. In such instances, when the requested data exceeds 109 bytes, the integrated transceiver may divide the data into an appropriate number of sections and concatenate the series of packets for one message using the packet identifiers as discussed above.

Checksum sections 680 and 690 may used to detect errors in the transmissions of the packets. In one embodiment, errors may be detected using cyclic redundancy check sum methodology. This methodology divides the message as a large binary number by the generating polynomial (in this case, CRC-16). The remainder of this division is then sent with the message as the checksum. The receiver then calculates a checksum using the same methodology and compares the two checksums. If the checksums do not match, the packet or message will be ignored. While this error detection methodology is preferred, one of ordinary skill in the art will appreciate that other error detection systems may be employed.

One of ordinary skill in the art will appreciate that automated monitoring system 100 may employ wireless and/or wired communication technologies for communication between site controller 150 and the RF transceivers. In one embodiment, communication between site controller 150 and the RF transceivers may be implemented via an RF link at a basic rate of 4,800 bits per second (bps) and a data rate of 2400 bps. All the data may be encoded in Manchester format such that a high to low transition at the bit center point represents a logic zero and a low to high transition represents a logic one. One of ordinary skill in the art will appreciate that other RF formats may be used depending upon design needs. By way of example, a quadature phase shift encoding method may also be used, thereby enabling automated monitoring system 100 to communicate via hexadecimal instead of binary.

Messages may further include a preface and a postscript (not shown). The preface and postscripts are not part of the message body but rather serve to synchronize automated monitoring system 100 and to frame each packet of the message. The packet may begin with the preface and end with a postscript. The preface may be a series of twenty-four logic ones followed by two bit times of high voltage with no transition. The first byte of the packet may then follow immediately. The postscript may be a transition of the transmit data line from a high voltage to a low voltage. It may be less desirable to not leave the transmit data line high after the message is sent. Furthermore, one of ordinary skill in the art will appreciate that the preface and the postscript may be modified as necessary for design needs.

FIG. 7 sets forth one embodiment of the "to" address byte assignment. The "to" address may take many forms depending on the specific requirements of automated monitoring system 100. In one embodiment, the "to" address may consist of six bytes. The first byte (Byte 1) may indicate the device type. The second byte (Byte 2) may indicate the manufacturer or the owner. The third byte (Byte 3) may be a further indication of the manufacturer or owner. The fourth byte (Byte 4) may indicate that the message is for all devices or that the message is for a particular device. If the message is for all devices, the fourth byte may be a particular code. If the message is for a particular device, the fourth, fifth, and sixth bytes (Byte 5 and Byte 6) may include the unique identifier for that particular device.

Having described the general message structure of the present invention, reference is directed to FIG. 8. FIG. 8 illustrates the general message structure for an emergency message. The message illustrates the broadcast of an emergency message "FF" from a central server with an address "0012345678" to a integrated transceiver with an address of "FF."

Returning to FIG. 1, the site controller 150 functions as the local communications master in automated monitoring system 100. With the exception of emergency messages, the site controller 150 may initiate communication with any RF communication device. The RF communication device then responds based upon the command received in the message. In general, the site controller 150 may expect a response to all messages sent to any of the RF communication devices. By maintaining the site controller 150 as the communications master and storing the collected data at the site controller 150, overall system installation, upkeep costs, and expansion costs may be minimized. By simplifying the RF communication devices, the initial cost and maintenance of the RF communication devices may be minimized. Further information regarding the normal mode of communications can be found in U.S. patent application Ser. No. 09/812,044, entitled "System and Method for Monitoring and Controlling Remote Devices," and filed Mar. 19, 2001, which is hereby incorporated in its entirety by reference.

As stated above, automated monitoring system 100 may be configured such that other devices, such as FOB 170 and certain RF transceivers, may initiate emergency messages. To accommodate receiving emergency messages, the site controller 150 may dedicate a predetermined time period, for example one-half of every ten-second period, to receive emergency messages. During these time periods, the site controller 150 may not transmit messages other than acknowledgements to any emergency messages. The integrated transceiver 135 may detect the period of silence, and in response, may then transmit the emergency message.

There are typically two forms of emergency messages: from the FOB 170 and from permanently installed safety/security transceiver(s). In the first case of the FOB 170, the emergency message may comprise a predetermined "to" address and a random odd number. In response to this emergency message, the site controller 150 may acknowledge during a silent period. The FOB 170 then repeats the same emergency message. The site controller 150 may forward the emergency message to the WAN 120 in the normal manner.

Upon receipt of the site controller 150 acknowledgement, the FOB 170 may reset itself If no acknowledgement is received within a predetermined time period, the FOB 170 may continue to re-transmit the original emergency message until acknowledged by the site controller 150 for a predetermined number of re-transmissions.

One of ordinary skill in the art will appreciate that the RF transceivers of the present invention may be further integrated with a voice-band transceiver. As a result, when a person presses, for example, the emergency button on his/her FOB 170, medical personnel, staff members, or others may respond by communicating via two-way radio with the party in distress. In this regard, each transceiver may be equipped with a microphone and a speaker that would allow a person to communication information such as their present emergency situation, their specific location, etc.

Figure 9:
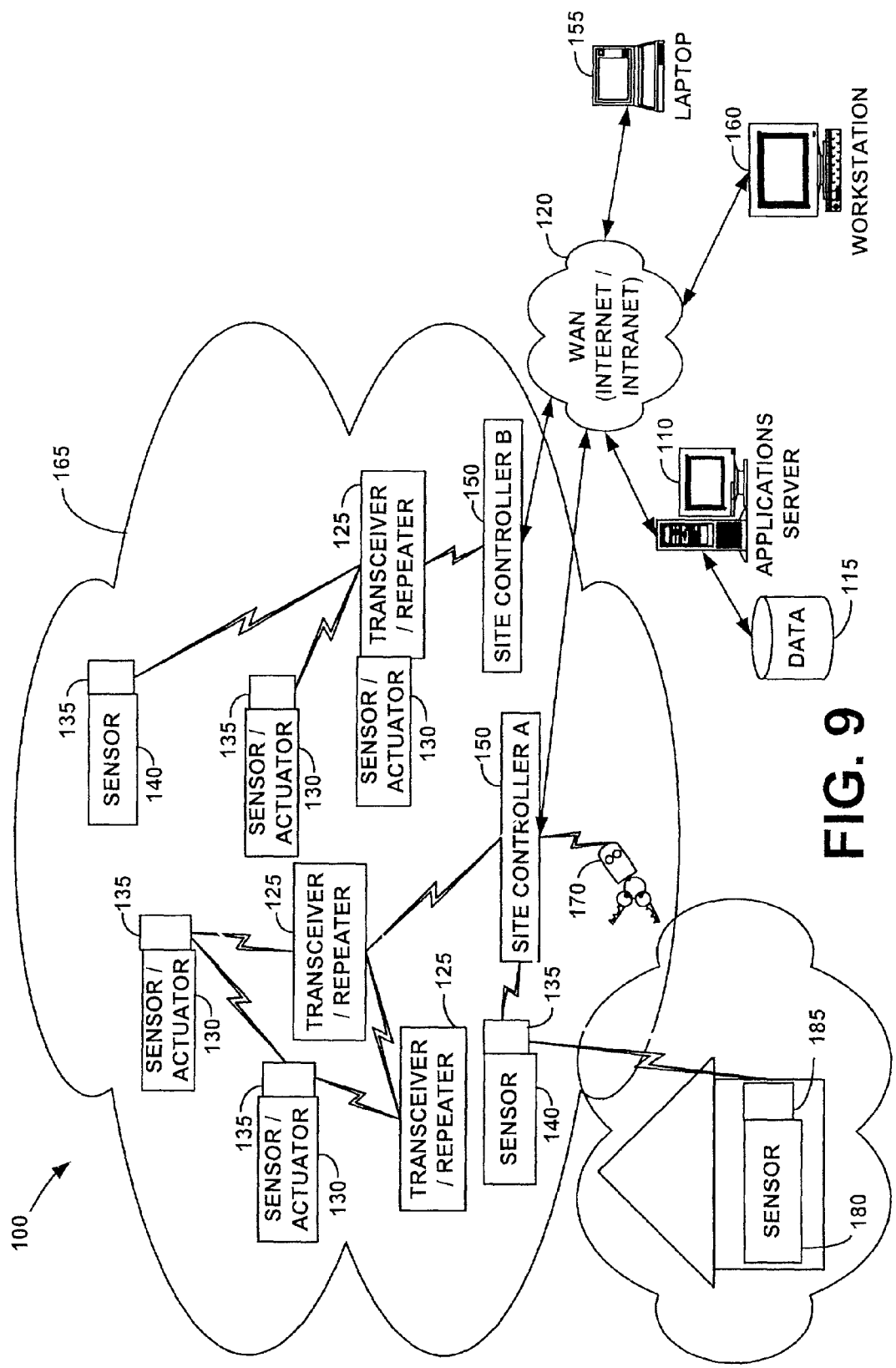
FIG. 9 illustrates another embodiment of the automated monitoring system according to the present invention.

FIG. 9 sets forth another embodiment of automated monitoring system 100 according to the present invention. FIG. 9 illustrates the automated monitoring system 100 of FIG. 1 with an additional sensor 180 and transceiver 185. The additional sensor 180 and transceiver 185 may communicate with, but outside of, the coverage area 165 of the automated monitoring system 100. In this example, the additional sensor/transceiver may be placed outside of the original coverage area 165. In order to communicate, the coverage area of transceiver 185 need only overlap the coverage area 165. By way of example only, the original installation may be a system that monitors electricity via the utility meters in an apartment complex. Later a neighbor in a single family residence nearby the apartment complex may remotely monitor and control their thermostat by installing a sensor/actuator transceiver according to the present invention. The transceiver 185 then communicates with the site controller 150 of the apartment complex. If necessary, repeaters (not shown) may also be installed to communicate between the neighboring transceiver 185 and the apartment complex site controller 150. Without having the cost of the site controller, the neighbor may enjoy the benefits of automated monitoring control system 100.

The foregoing description has been presented for purposes of illustration and description. It is not intended to be exhaustive or to limit the inventions to the precise embodiments disclosed. Obvious modifications or variations are possible in light of the above teachings. When the transceiver is permanently integrated into an alarm sensor or other stationary device within a system, then the application server 110 and/or the site controller 150 may be configured to identify the transceiver location by the transceiver identification number alone. It will be appreciated that, in embodiments that do not utilize stand-alone transceivers, the transceivers may be configured to transmit at a higher RF power level in order to effectively communicate with the control system site controllers.

It will be appreciated by those skilled in the art that the information transmitted and received by the wireless transceivers of the present invention may be further integrated with other data transmission protocols for transmission across telecommunications and computer networks. In addition, it should be further appreciated that telecommunications and computer networks may function as the transmission path between the networked wireless transceivers, the site controllers 150, and the applications servers 110.

What is claimed is:

1. A mobile communication device for use with an automated monitoring system for monitoring and controlling a plurality of remote devices, the automated monitoring system comprising a site controller in communication with the plurality of remote devices via a plurality of transceivers defining a wireless communication network and in communication with a host computer via a wide area network, the mobile communication device comprising:
    memory comprising a unique identifier associated with the mobile communication device;
    logic responsive to a transmit command to retrieve the unique identifier from memory and generate a transmit message using a predefined communication protocol being implemented by the wireless communication network, the transmit message comprising the unique identifier such that the transmit message may be received by the site controller via the wireless communication network and such that the site controller may identify the mobile communication device and notify the host computer of the transmit message;
    a wireless transmitter to communicate over the wireless communication network and to provide the transmit message to the wireless communication network;
    wherein the predefined communication protocol comprises a data packet comprising: a receiver address identifying the receiver of the data packet; a sender address identifying the sender of the data packet; and a command indicator specifying a predefined command code; and
    the data packet further comprising a data payload, a checksum field for performing a redundancy check, a packet length indicator which indicates a total number of bytes in the current packet; a total packet indicator which indicates the total number of packets in the current message; and a current packet indicator which identifies the current packet; and a message number identifying the current message.

2. The device of claim 1, wherein the logic is stored in memory and the device further comprises a microcontroller responsive to the transmit command and to implement the logic.

3. The device of claim 1, wherein the wireless transmitter provides the transmit message as a radio frequency signal.

4. The device of claim 1, wherein the wireless transmitter provides the transmit message as a low power radio frequency signal.

5. The device of claim 1, wherein the logic encrypts the transmit message.

6. The device of claim 1, wherein the transmit message comprises an emergency command.

7. The device of claim 1, further comprising a wireless receiver integrated with the wireless transmitter and wherein the transmit message is retransmitted until an acknowledgement command is received from the site controller.

8. The device of claim 1, wherein the mobile communication device is integrated with a handheld computer.

9. The device of claim 1, wherein the mobile communication device is integrated with a wireless telephone.

10. The device of claim 1, wherein the mobile communication device is integrated with a wireless telephone.

11. A mobile communication device for use with an automated monitoring system for monitoring and controlling a plurality of remote devices, the automated monitoring system comprising a site controller in communication with the plurality of remote devices via a plurality of transceivers defining a wireless communication network and in communication with a host computer via a wide area network having multiple available communication links between the remote devices, site controller, and the host computer, the mobile communication device comprising:
    a means for storing a unique identifier associated with the mobile communication device;
    a means, responsive to a transmit command, for retrieving the unique identifier from memory and for generating a transmit message using a predefined communication protocol being implemented by the wireless communication network, the transmit message comprising the unique identifier such that the transmit message may be received by the site controller via the wireless communication network and such that the site controller may identify the mobile communication device and notify the host computer of the transmit message;
    a means for providing the transmit signal over the wireless communication network; and
    wherein the predetermined communication protocol comprises a data packet comprising a packet length indicator which indicates a total number of bytes in the current packet; a total packet indicator which indicates the total number of packets in the current message; and a current packet indicator which identifies the current packet; and a message number identifying the current message.

12. The device of claim 11, wherein the means for providing the transmit message involves radio frequency communication.

13. The device of claim 11, wherein the means for providing the transmit message involves low power radio frequency communication.

14. The device of claim 11, wherein the predefined communication protocol comprises a data packet comprising: a receiver address identifying the receiver of the data packet; a sender address identifying the sender of the data packet; and a command indicator specifying a predefined command code.

15. The device of claim 11, further comprising a means for encrypting the transmit message.

16. The device of claim 11, wherein the transmit message comprises a means for identifying an emergency.

17. The device of claim 11, further comprising a means for receiving an acknowledgement command from the wireless communication network and wherein the means for providing the transmit message retransmits the transmit signal until an acknowledgement command is received.

18. The device of claim 11, wherein the mobile communication device is integrated with a handheld computer.

19. A method for enabling a mobile user to notify an automated monitoring system of an emergency situation, the automated monitoring system monitoring and controlling a plurality of remote devices and comprising a site controller in communication with the plurality of remote devices via a plurality of transceivers defining a wireless communication network and in communication with a host computer via a wide area network, the method comprising:
    receiving notification that the mobile user desires to initiate transmission of an emergency message to the site controller via a communication link substantially constantly available;

determining the identity of the mobile user at the site controller;

providing the emergency message over the wireless communication network for delivery to the site controller, the emergency message indicating the identity of the mobile user; and wherein the emergency message comprises a data packet comprising a packet length indicator which indicates a total number of bytes in the current packet; a total packet indicator which indicates the total number of packets in the current message; and a current packet indicator which identifies the current packet; and a message number identifying the current message.

20. The method of claim 19, further comprising the step of receiving acknowledgement from the site controller over the wireless communication network that the emergency message was received.

21. The method of claim 20, wherein the step of providing the emergency message is repeated periodically until acknowledgement is received.

* * * * *